United States Patent
Katranov et al.

(10) Patent No.: US 11,954,465 B2
(45) Date of Patent: Apr. 9, 2024

(54) APPARATUSES, METHODS, COMPUTER PROGRAMS, AND DATA CARRIERS FOR INDICATING AND DETECTING ATOMIC OPERATIONS

(71) Applicant: Intel Corporation, Santa Clara, CA (US)

(72) Inventors: Alexei Katranov, Nizhny Novgorod (RU); Stanislav Bratanov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/643,856

(22) Filed: Dec. 13, 2021

(65) Prior Publication Data
US 2023/0185547 A1    Jun. 15, 2023

(51) Int. Cl.
*G06F 8/41* (2018.01)
*G06F 8/53* (2018.01)
*G06F 9/30* (2018.01)

(52) U.S. Cl.
CPC .................. *G06F 8/41* (2013.01); *G06F 8/53* (2013.01); *G06F 9/30094* (2013.01); *G06F 9/30032* (2013.01)

(58) Field of Classification Search
CPC .... G06F 9/30032; G06F 9/30094; G06F 8/53; G06F 8/41
See application file for complete search history.

(56) References Cited

U.S. PATENT DOCUMENTS

| | | | |
|---|---|---|---|
| 6,990,438 B1 * | 1/2006 | Chowdhury | G06F 30/33 703/15 |
| 8,099,726 B2 * | 1/2012 | Harris | G06F 9/45525 717/160 |
| 2003/0074649 A1 * | 4/2003 | Poulsen | G06F 8/51 717/114 |
| 2006/0288173 A1 * | 12/2006 | Shen | G06F 12/0833 711/141 |
| 2006/0294326 A1 * | 12/2006 | Jacobson | G06F 9/3842 712/E9.05 |
| 2009/0031310 A1 * | 1/2009 | Lev | G06F 9/466 718/101 |
| 2009/0172306 A1 * | 7/2009 | Nussbaum | G06F 9/466 712/229 |
| 2009/0282386 A1 * | 11/2009 | Moir | G06F 9/466 717/106 |

(Continued)

OTHER PUBLICATIONS

Gonzalo et al., "Automatic Generation of Warp-Level Primitives and Atomic Instructions for Fast and Portable Parallel Reduction on GPUs" (Year: 2019).*

*Primary Examiner* — Phillip H Nguyen
(74) *Attorney, Agent, or Firm* — 2SPL Patent Attorneys PartG mbB; Yong Beom Hwang (57) ABSTRACT

An apparatus comprising at least one interface configured to read one or more high-level code instructions; and at least one processor configured to read the one or more high-level code instructions using the interface, determine atomic operations in the high-level code instructions, and translate the one or more high-level code instructions into assembly code instructions, wherein atomic operations are indicated in the assembly code instructions based on the atomic operations in the high-level code instruction.

9 Claims, 10 Drawing Sheets

(56) References Cited

U.S. PATENT DOCUMENTS

| | | | | |
|---|---|---|---|---|
| 2009/0282405 A1* | 11/2009 | Moir | ................ | G06F 9/467 |
| | | | | 718/100 |
| 2009/0282410 A1* | 11/2009 | Moir | ................ | G06F 9/467 |
| | | | | 718/101 |
| 2010/0122073 A1* | 5/2010 | Narayanaswamy | .... | G06F 9/467 |
| | | | | 712/E9.016 |
| 2012/0204163 A1* | 8/2012 | Marathe | ............ | G06F 8/4442 |
| | | | | 717/151 |
| 2015/0378778 A1* | 12/2015 | Gschwind | ......... | G06F 3/0653 |
| | | | | 711/147 |
| 2019/0042219 A1* | 2/2019 | Shankar | ............ | G06F 8/441 |

* cited by examiner

```
/// shared variables
int syncronized_data, racy_data;
/// atomic variable to pass the synchronization signal
std::atomic<int> sync;

/// thread 1:

/// prepared the data
syncronized_data = 1;

/// send the signal that the data is ready
sync.store(2, std::memory_order_release);

/// prepared the additional data after the signal
/// that contributes to a data race
racy_data = 3;

/// thread 2:

/// check if the signal is received
if (sync.load(std::memory_order_acquire) == 2) {

/// read the first data that is properly synchronized
    (void)syncronized_data;

/// read the second data that contributes to a data race
    (void)racy_data;
}
```

Fig. 4

```
/// Traditional code translation:

/// thread 1:

/// prepared the data
    mov    DWORD PTR [40402Ch],0x1    # 40402c <syncronized_data>

/// send the signal that the data is ready
    mov    DWORD PTR [404034h],0x2    # 404034 <sync>

/// prepared the additional data after the signal
/// that contributes to a data race
    mov    DWORD PTR [404030h],0x3    # 404030 <racy_data>

/// thread 2:

/// check if the signal is received
    mov    eax,DWORD PTR [404034h]    # 404034 <sync>
    cmp    eax,0x2
    jne    sync_is_not_ready /// read the first data that is properly synchronized
    mov    eax,DWORD PTR [40402Ch]    # 40402c <syncronized_data>

/// read the second data that contributes to a data race
    mov    eax,DWORD PTR [404030h]    # 404030 <racy_data> sync_is_not_ready:
```

Fig. 5

```
/// Suggested new code translation
/// where all accesses to a syncronization variables are marked:

/// thread 1:

/// prepared the data
    mov     DWORD PTR [40402Ch],0x1     # 40402c <syncronized_data>

/// send the signal that the data is ready
    db      3eh ///  mark access with DS: prefix
    mov     DWORD PTR [404034h],0x2     # 404034 <sync>

/// prepared the additional data after the signal
/// that contributes to a data race
    mov     DWORD PTR [404030h],0x3     # 404030 <racy_data>

/// thread 2:

/// check if the signal is received
    db      3eh ///  mark access with DS: prefix
    mov     eax,DWORD PTR [404034h]     # 404034 <sync>
    cmp     eax,0x2
    jne     sync_is_not_ready /// read the first data that is properly synchronized
    mov     eax,DWORD PTR [40402Ch]     # 40402c <syncronized_data>

/// read the second data that contributes to a data race
    mov     eax,DWORD PTR [404030h]     # 404030 <racy_data> sync_is_not_ready:
```

Fig. 6

```
/// data we'd like to share between threads
/// and ensure accesses are serialized
static int a = 0, b = 0;

/// flag that indicates data can be accessed
static volatile int flag = 0;

/// data each thread uses independently
int c = 0, d = 0;

/// increment the flag atomically
/// the first thread to increment gets access to data
if(InterlockedIncrement(&flag))
{
    /// modify the shared data
    a += 1; b += 2;

/// modify thread-specific data
    /// (this can be done anywhere -
    ///  both inside and outside the atomic region)
    c += 3;

/// clear the flag to indicate new data became available
    /// (this operation is atomic and ordered with regard to
    ///  previous operations on Intel Architecture, but
    ///  not on other architectures)
    flag = 0;

/// modify thread-specific data
    /// (this can be done anywhere -
    ///  both inside and outside the atomic region)
    d += 4;
}
```

Fig. 7

```
/// Traditional code translation:

/// Increment the flag to gain access to data
        lock add    dword ptr [4319C0h],1
/// failed to get access, may repeat in the future
        je          failed_to_get_access
/// modify variable 'a'
        add         dword ptr [4319C4h],1
/// modify variable 'b'
        add         dword ptr [4319C8h],2
/// modify variable 'c'
        add         dword ptr [rsp+48h],3
/// clear the flag
        mov         dword ptr [4319C0h],r11d
/// modify variable 'd'
        add         dword ptr [rsp+40h],4

/// Problems to resolve in a traditional correctness analysis tool:
///    Which variables need to be protected?
///            - No idea without extra info!
///    How are they protected?
///            - By guarding with flag and interlocked accesses -
///              as 'lock' prefix can be easily detected.
```

Fig. 8

```
/// Suggested new code translation
/// where all access to protected variables are marked:

/// Increment the flag to gain access to data
        lock add    dword ptr [4319C0h],1
/// failed to get access, may repeat in the future
        je      failed_to_get_access
/// modify variable 'a'
        db      3eh ///  mark access with DS: prefix
        add     dword ptr [4319C4h],1
/// modify variable 'b'
        db      3eh ///  mark access with DS: prefix
        add     dword ptr [4319C8h],2
/// modify variable 'c'
        add     dword ptr [rsp+48h],3
/// clear the flag
        db      3eh ///  mark access with DS: prefix
        mov     dword ptr [4319C0h],r11d
/// modify variable 'd'
        add     dword ptr [rsp+40h],4

/// Answers from tools following our novel approach:
///   Which variables need to be protected?
///             - They all are clearly marked!
///   How are they protected?
///             - By guarding with flag and interlocked accesses -
///               as 'lock' prefix can be easily detected.
///               We can mark the flag operations with DS: prefix
///               to simplify the analysis.

/// What if a memory operation already uses a segment prefix?
///    That can happen when accessing OS internal structures addressed
///    via GS: or FS: segments.
/// Answer: Duplicate the existing segment prefix, example:
        db      65h     /// duplicate GS: prefix
        add     byte ptr gs:[rax],5
```

APPARATUSES, METHODS, COMPUTER PROGRAMS, AND DATA CARRIERS FOR INDICATING AND DETECTING ATOMIC OPERATIONS

BACKGROUND

Parallel programming is prone to numerous issues arising from concurrent data accesses, also known as data races. The more complex a parallel application is, the more likely it is that it contains data races, and the harder they are to detect and eradicate.

There are tools available for the correctness analysis of parallel programs, and detection of races. For example, "inspector"- or "thread sanitizer"-tools can be used to detect races and formally prove that an application is race-free. However, those tools may require code instrumentation or debug information that makes them unusable for production code and, as a result, for larger applications comprised of multiple independent modules from different software vendors.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example," "various examples," "some examples," and the like may include features, structures, or characteristics, but not every example necessarily includes the particular features, structures, or characteristics.

Some examples may have some, all, or none of the features described for other examples.

"First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an example," "in examples," "in some examples," and/or "in various examples," each of which may refer to one or more of the same or different examples. Furthermore, the terms "comprising," "including," "having," and the like, as used with respect to examples of the present disclosure, are synonymous.

Figure 1:
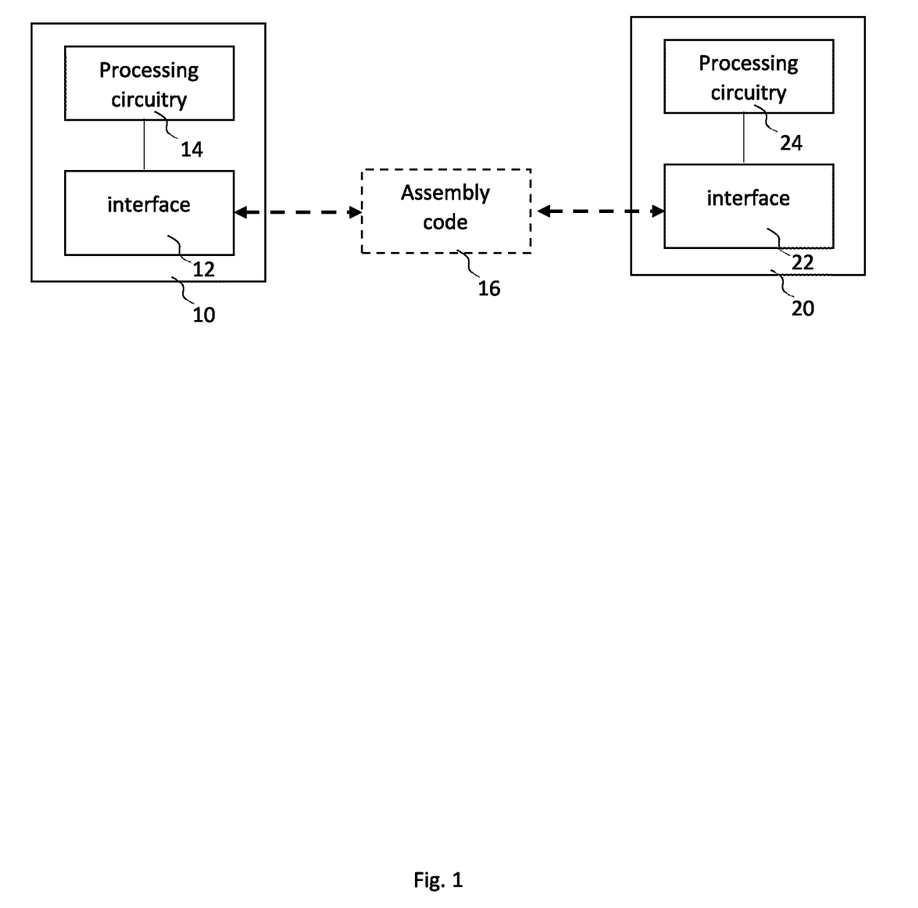
FIG. 1 shows block diagrams of examples of apparatuses.

FIG. 1 shows block diagrams of examples of apparatuses 10, 20. FIG. 1 illustrates an apparatus 10, which comprises at least one interface 12 configured to read one or more high-level code instructions. The at least one interface 12 is coupled to at least one processor 14. The apparatus 10 further comprises the at least one processor 14, which is configured to read the one or more high-level code instructions using the interface 12 and to determine atomic operations in the high-level code instructions. Moreover, the at least one processor 14 is configured to translate the one or more high-level code instructions into assembly code instructions 16. Atomic operations are indicated in the assembly code instructions based on the atomic operations in the high-level code instruction.

FIG. 1 shows the accesses to the assembly code and the assembly code as such are shown in dotted lines as these are optional from the perspective of the apparatuses 10 and 20. FIG. 1 further illustrates an example of an apparatus 20. The apparatus 20 comprises at least one interface 22, which is configured to read one or more assembly code instructions 16. The at least one interface 22 is coupled to at least one processor 24. The apparatus 20 further comprises the at least one processor 14, which is configured to determine indications for atomic operations in the one or more assembly code instructions 16 and to detect atomic operations based on the one or more assembly code instructions 16 and the indications for the atomic operations in the assembly code instructions 16.

For example, atomics or atomic operations may describe a unitary action or object that is essentially indivisible, unchangeable, whole, and irreducible. An atomic function/operation may be a function/operation that will either complete or return to its original state if a power interruption or an abnormal end occurs. Atomic operations may hence be locked operations, non-interruptible operations, etc.

Assembly code or assembly code instructions may be any low-level programming language (machine code) which can directly be interpreted by or assembled for an according machine, e.g. a processor, a processing architecture or a processing component. For example, the assembly code may comprise instructions that can be assembled to machine code, which can be executed one by one by an according machine without further compilation or translation. Constants, comments, assembler directives, symbolic labels of program and memory locations, and macros may also be supported. The assembly code may depend on machine code instructions and may hence be specific to a particular computer architecture. In contrast to assembly languages, most high-level programming languages are generally portable across multiple architectures but require interpreting or compiling, a much more complicated task than assembling.

In examples, the respective at least one interface 12, 22 of the apparatuses 10, 20 may be implemented as any means for communicating information, e. g. transmitting, receiving, or transmitting and receiving. For example, the at least one interface 12, 22 may correspond to one or more contacts, inputs/outputs, and/or modules to communicate physical signals. The at least one interface 12, 22 may be a software interface/module and/or an interface to a transmission medium. The at least one interface 12, 22 may be configured to take as input and/or provide as output any data that is processed by the at least one processor 14.

As further shown in FIG. 1 the respective at least one interface 12, 22 is coupled to the corresponding at least one processor 14, 24, which controls the at least one interface 12, 22. In examples, the at least one processor 14, 24 may be implemented using one or more processing units, one or more processing devices, any means for processing, such as a processor, a computer or a programmable hardware component being operable with accordingly adapted software. In other words, the described function of the processor 14, 24 may as well be implemented in software, which is then executed on one or more programmable hardware components. Such hardware components may comprise a general-purpose processor, a Digital Signal Processor (DSP), a micro-controller, central processing unit (CPU), etc.

In examples, the at least one interface 12 may be configured to output assembly code instructions 16, and the at least one processor 14 may be configured to output the assembly code instructions 16 with the indicated atomic instructions using the at least one interface 12. At the apparatus 20, the at least one interface 22 may be configured to output information on detected data races in the assembly code instructions, and the at least one processor 24 may be configured to output the information on detected data races using the at least one interface 22.

Figure 2:
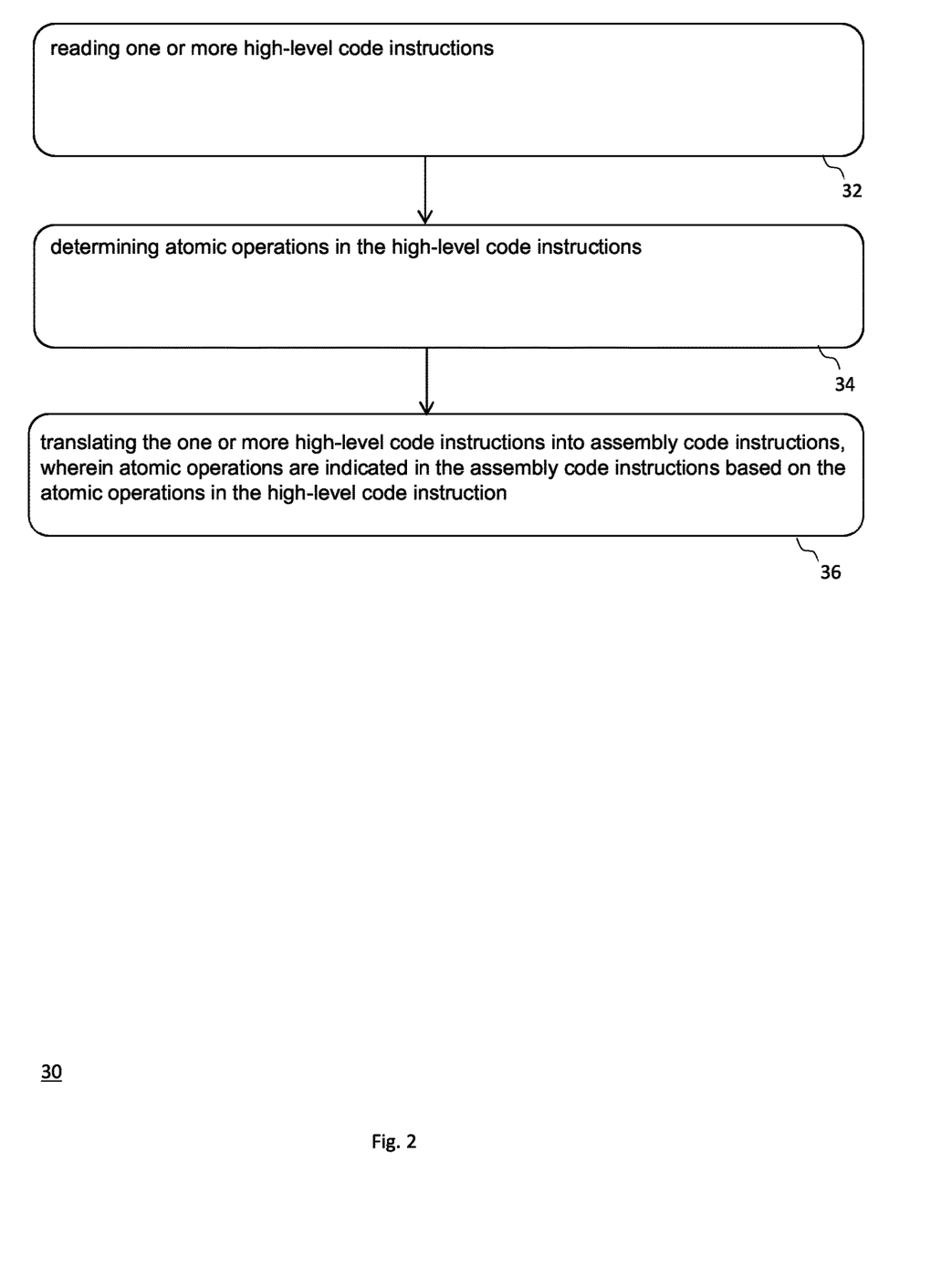
FIG. 2 shows a block diagram of an example of a method for generating assembly code instructions.

FIG. 2 shows a block diagram of an example of a method 30 for generating assembly code instructions. The method 30 for generating assembly code instructions comprises 32 reading one or more high-level code instructions and determining 34 atomic operations in the high-level code instructions. The method 30 further comprises translating 36 the one or more high-level code instructions into assembly code instructions. The atomic operations are indicated in the assembly code instructions based on the atomic operations in the high-level code instruction.

Figure 3:
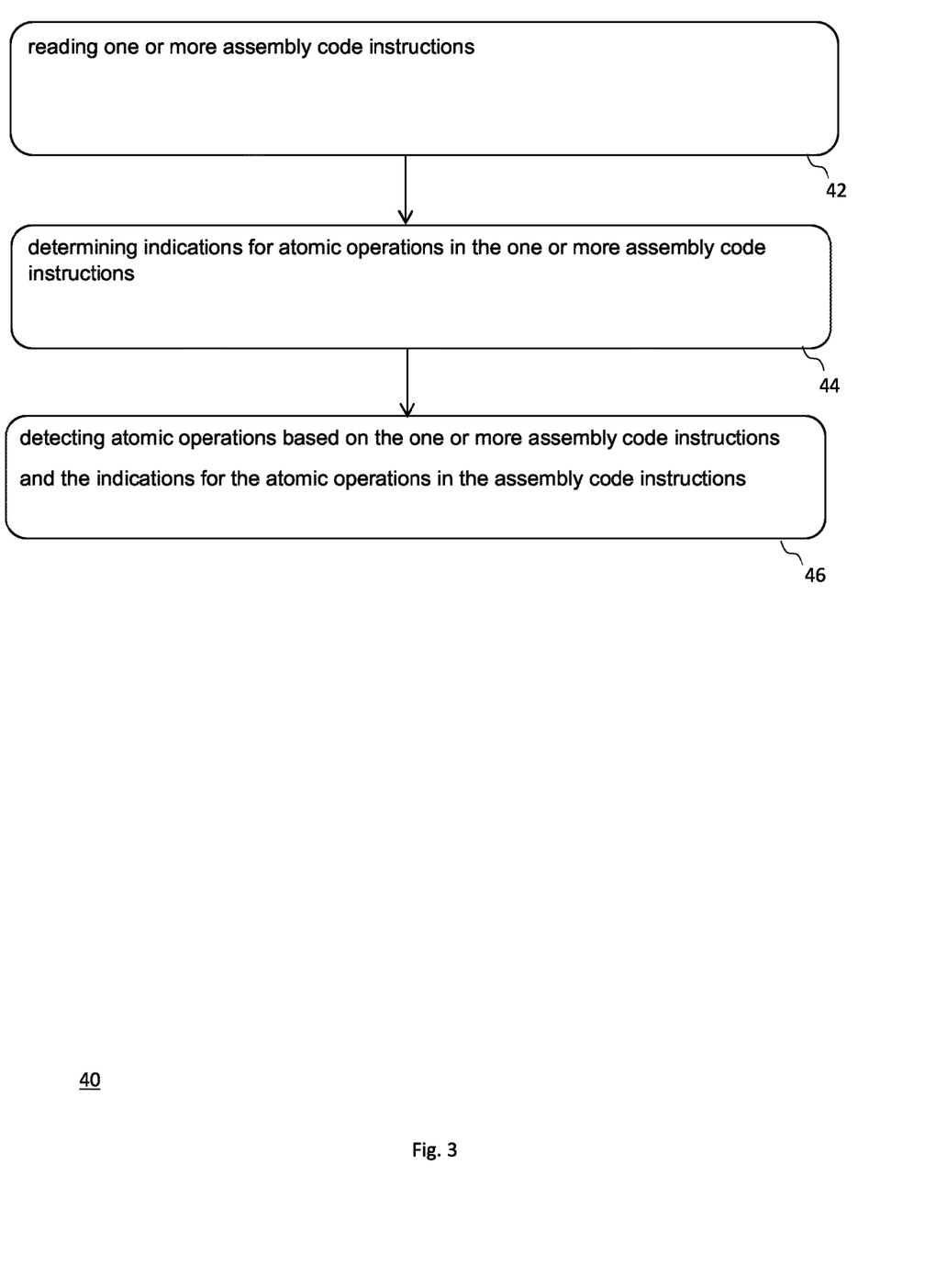
FIG. 3 shows a block diagram of an example of a method for detecting atomic operations.

FIG. 3 shows a block diagram of an example of a method 40 for detecting atomic operations. The method 40 for detecting atomic operations, comprises reading 42 one or more assembly code instructions, and determining 44 indications for atomic operations in the one or more assembly code instructions. The method 40 further comprises detecting 46 atomic operations based on the one or more assembly code instructions and the indications for the atomic operations in the assembly code instructions.

Another example is a compiler comprising the apparatus 10 or components to perform the method 30. Yet another embodiment in an instrumentation or inspector tool comprising the apparatus 20 or components to perform the method 40.

Examples may provide a capability to detect potential concurrent data access issues (data races) in highly optimized complex applications, regardless of the quality or availability of debugging information. Such data race detection can be based on the atomic operations. For example, the at least one processor 24 may be configured to detect data races based on the atomic operations. Additionally or alternatively, the at least one processor 24 may be configured to use the detected atomic operations for memory analysis. Such a memory analysis may further serve as a basis for detecting a memory structure, a memory utilization, analysis of atomic memory operations, use for simulation-based analysis (for other architectures), etc.

In further examples, inspector-tools may dynamically instrument binary code to track synchronization and detect data races. For example, on x86 binary level, many C/C++ atomic operations are easily detectible due to the LOCK prefix. However, atomic operations for load and store are indistinguishable from non-atomic operations: They all are represented as usual MOV instructions. This makes it impossible to correctly track synchronizations and detect data races. To resolve the issue, inspector tools use debug information to recognize which MOV instructions correspond to atomics. However, many software developers prefer to ship their production code without debug information. Additionally, the debug information is not always accurate. Overall, using binary instrumentation on production applications is not reliable.

In examples, the at least one processor 14 may be configured to indicate the atomic operations in the assembly code instructions using meta information. For example, the meta information may be ineffective on a result of an execution of the assembly code instructions. The at least one processor 14 may be configured to indicate the atomic operations in the assembly code instructions using information that is ignored by a processor architecture, the assembly code instructions are translated for. For example, the processor architecture is a x86 architecture. Examples may mark the required operations with instruction prefixes that are not affecting the result of the instruction execution. Additionally or alternatively, distinguishable code patterns may be employed to mark the memory operations as will be detailed subsequently. The at least one processor 14 may be configured to indicate the atomic operations in the assembly code instructions using instruction prefixes that do not affect a result of an instruction execution. Additionally or alternatively, the at least one processor 14 may be configured to indicate the atomic operations in the assembly code instructions using distinguishable code patterns to mark atomic memory operations.

At least in some examples, the indications may have negligible code size impact, and almost zero performance impact, unlike code instrumentation-based approaches. Examples may enable analysis of parallel applications of any size and complexity by eliminating dependencies on the quality and availability of third-party debug information. Methods 30, 40 may be easily adopted by compilers and/or inspection tools.

The indicative code patterns may be easily revealed by compiling and then disassembling a code and the use of atomic and non-atomic operations can be determined. In examples, such operation may be carried out by the apparatus 20. The at least one processor 24 may be configured to determine the indications for the atomic operations in the one or more assembly code instructions using meta information in line with the above, which, for example, may be ineffective on a result of an execution of the assembly code instructions. In line with the above, the at least one processor 24 on the side of the apparatus 20 may be configured to determine the indications for the atomic operations in the assembly code instructions using information that is ignored by a processor architecture, the assembly code instructions are translated for, e.g. a x86 architecture. For example, the at least one processor 24 is configured to determine the indications for the atomic operations in the assembly code instructions using instruction prefixes that do not affect a result of an instruction execution, e.g. distinguishable code patterns may be used to mark atomic memory operations.

The compiler or a binary instrumentation used in examples may produce distinctively different code patterns for atomic memory operations (e.g. use segment prefixes).

For example, the C11/C++11 memory model states that "The execution of a program contains a data race if it contains two potentially concurrent conflicting actions, at least one of which is not atomic, and neither happens before the other". Therefore, to avoid races, the application should use special synchronization primitives and atomic variables. Usually, the analyzing tools can easily detect synchronization primitives via specific function calls. However, when optimization is enabled, atomic operations are often in-lined into the code and no function calls are generated.

Atomic operations are defined as a set of load, store and read-modify-write operations that can be used with different memory ordering: relaxed, consume, acquire, release, aquire_release, sequentially_consistent. All those interfaces can be mapped to x86-TSO (x86 Total Store Order memory model) relatively easily:

Any read-modify-write operation with any memory ordering corresponds to an operation with a LOCK prefix or XCHG (it has an implicit LOCK prefix) at the binary level.

A load operation is allowed to be used with relaxed, consume, acquire, sequentially_consistent memory ordering. The load operation with any allowed ordering is mapped into a MOV instruction.

A store operation is allowed to be used with relaxed, release, sequentially_consistent memory ordering:
The store operation with relaxed or release memory ordering is mapped into MOV instruction.
The store operation with sequentially_consistent ordering is mapped into XCHG or MOV and MFENCE (depending on a compiler).

Instructions with the LOCK prefix and XCHG can be detected by binary analysis and instrumentation tools (e.g., the Pin tool, a dynamic binary instrumentation tool). However, MOV instructions participating in atomic operations are indistinguishable from MOV instructions involved in ordinary data transfers. Therefore, on x86-TSO, for example, there is no difference between atomic load/store operations and non-atomic load/store operations, hence the data races cannot be detected with binary analysis tools.

Examples, may make use of segment prefixes in assembly instruction encoding, to add meta-information that does not affect execution. Further tools can the use this information to distinguish between atomic and non-atomic operations. As a result, MOV instructions related to atomic operations may be marked to make them detectable at the binary level.

For example, in x86 addressing mode, each memory instruction has an associated segment register, which is either implied or explicitly specified.

DS (data segment): is the default implicit segment prefix for memory operations, unless they refer to stack memory via SP (stack pointer) and BP (base pointer) registers, in which case the default implicit prefix is SS: (stack segment).

The 64-bit specification allows the explicit use of 2 segment prefixes—GS: and FS:, which are employed by operating systems for thread-local storage, exception handling, and similar purposes.

Examples may, for instructions corresponding to atomic memory operations, explicitly duplicate a segment prefix that those instructions use or imply: for example, if a MOV instruction references memory with no prefix specified, one-byte 3Eh encoding may be added before the instruction opcode to explicitly refer to DS: segment; or, if an instruction already uses GS: prefix, one-byte 65H encoding may be added, which will add an extra GS: prefix to that instruction. For example, the x86 architecture may ignore excessive prefixes, so they will not affect the execution or processor state but will convey valuable information to the binary analysis tools. In examples, the at least one processor 14 may be configured to indicate the atomic operations in the assembly code instructions using excessive segment prefixes. On the other side, the at least one processor 24 may be configured to determine the indications for the atomic operations in the assembly code instructions using excessive segment prefixes.

In examples, the at least one processor 14 may be configured to indicate the atomic operations in the assembly code instructions using a one-byte prefix, e.g. 3Eh or 65h, before an atomic instruction in the assembly code instructions. The at least one processor 14 may be configured to indicate the atomic operations in the assembly code instructions using a duplicated segment prefix that atomic operations use or imply. Likewise, the at least one processor 24 may be configured to determine the indication for the atomic operations in the assembly code instructions using a one-byte prefix, e.g. 3Eh or 65h before an atomic instruction in the assembly code instructions. The at least one processor 24 may be configured to determine the indication for the atomic operations in the assembly code instructions using a duplicated segment prefix that atomic operations use or imply.

Figure 4:
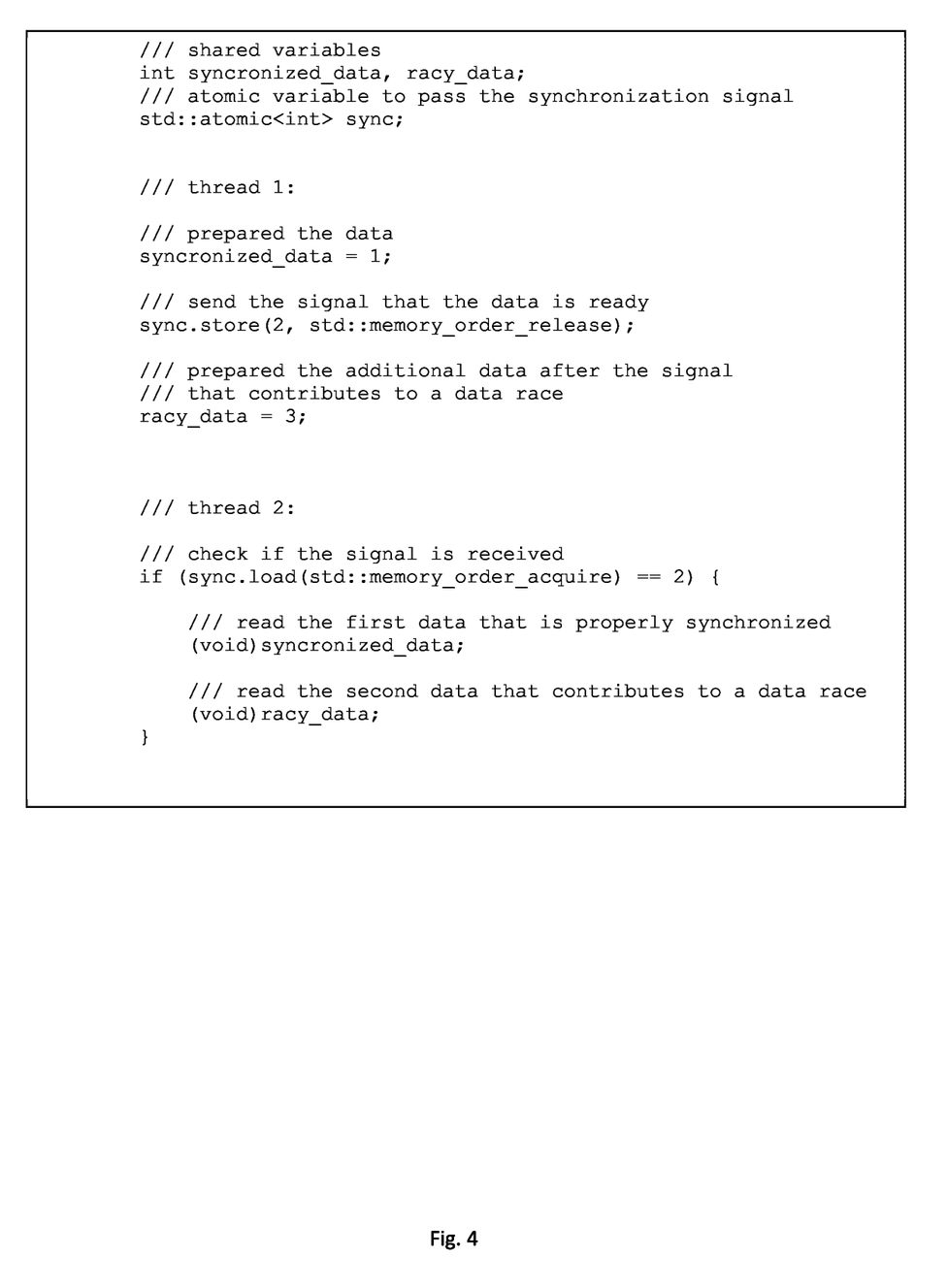
FIG. 4 shows a code snippet for basic synchronization in high level code.

FIG. 4 shows a code snippet for basic synchronization in assembly code. The code snippet demonstrates the basic C++ synchronization ("happens-before") between two threads. The synchronization is based on release and acquire memory barriers attached to store and load, respectively. All the data stored before the release barrier are observable after the acquire barrier, which is true for the shared variable "synchronized_data". However, the shared variable 'racy_data' is written after the release barrier, which leads to a data race.

Figure 5:
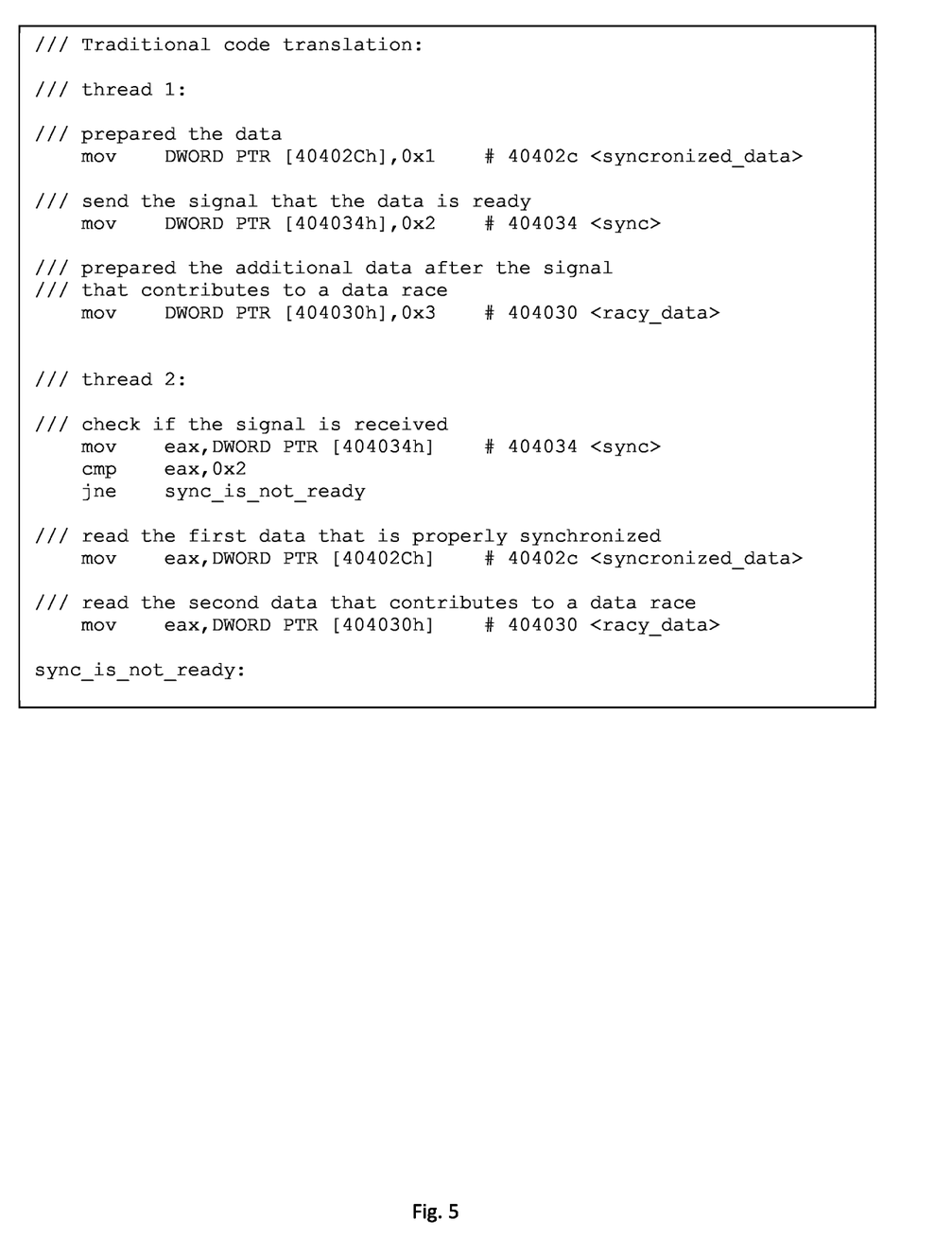
FIG. 5 shows a code snippet of traditional translated basic synchronization in assembly code.

FIG. 5 shows a code snippet for basic synchronization in assembly code, which is based on a translation of the high-level code shown in FIG. 4. That high-level code translates into the assembly code instruction of FIG. 5 according to traditional code translation.

The shared variables (40402c<syncronized_data> and 404030<racy_data>) cannot be distinguished from the atomic variable (404034<sync>) in the binary form because the same MOV instruction is used. Therefore, the binary analysis tool cannot recognize the synchronization and where the data race occurs.

Figure 6:
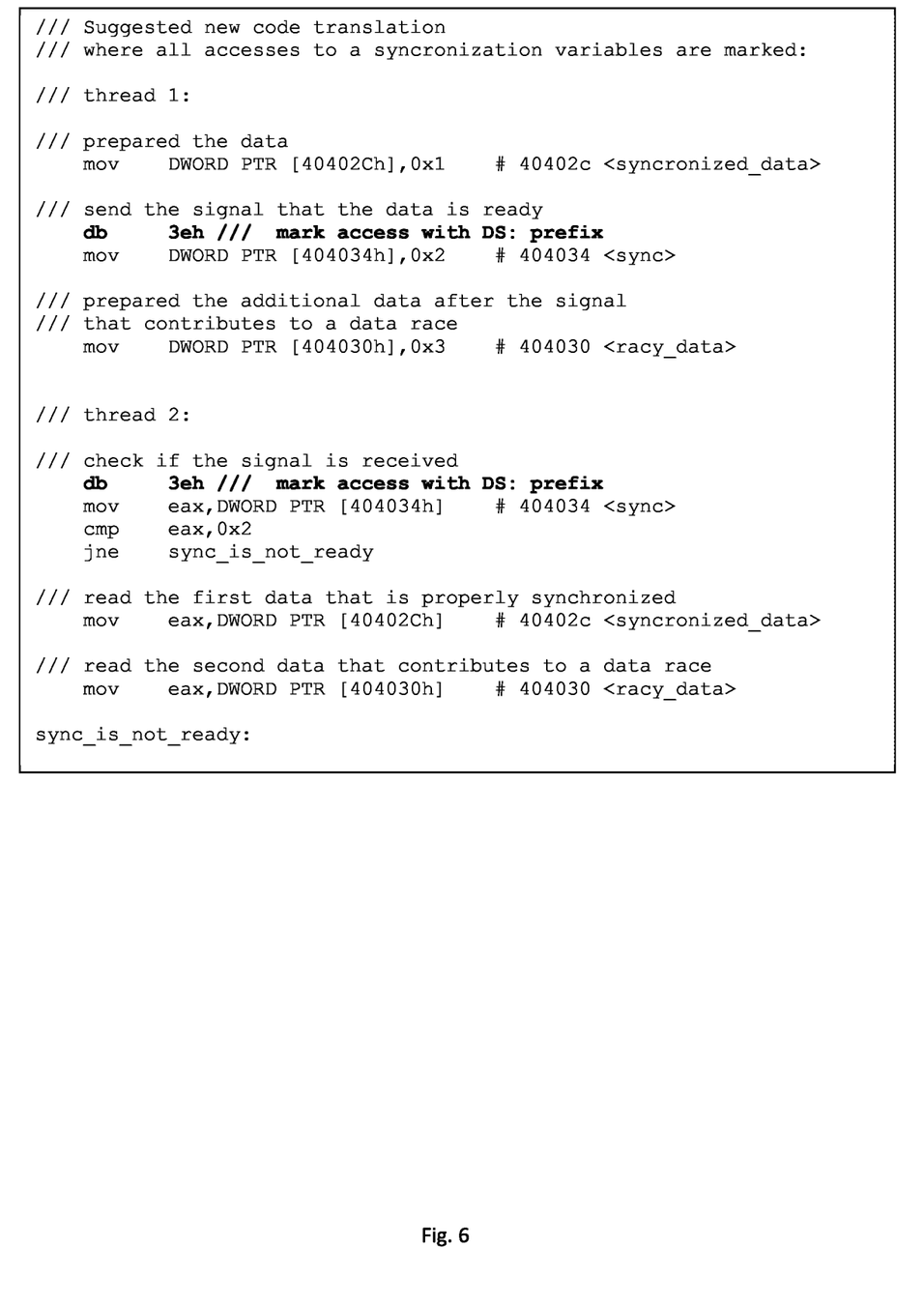
FIG. 6 shows a code snippet of translated basic synchronization in assembly code in an example.

Examples indicate which operations are to be performed atomically, which is shown in the code sample of FIG. 6. FIG. 6 shows a code translation of the high level code of FIG. 4 in an example. With the proposed instrumentation (bold lines in FIG. 6, accesses to 404034h are marked with DS: prefix), the analyzing tools can detect the synchronization over the atomic variable (404034<sync>) and trace that accesses to (40402c<syncronized_data>) are properly synchronized, while the accesses to (404030<racy_data>) contribute to a data race.

Figure 7:
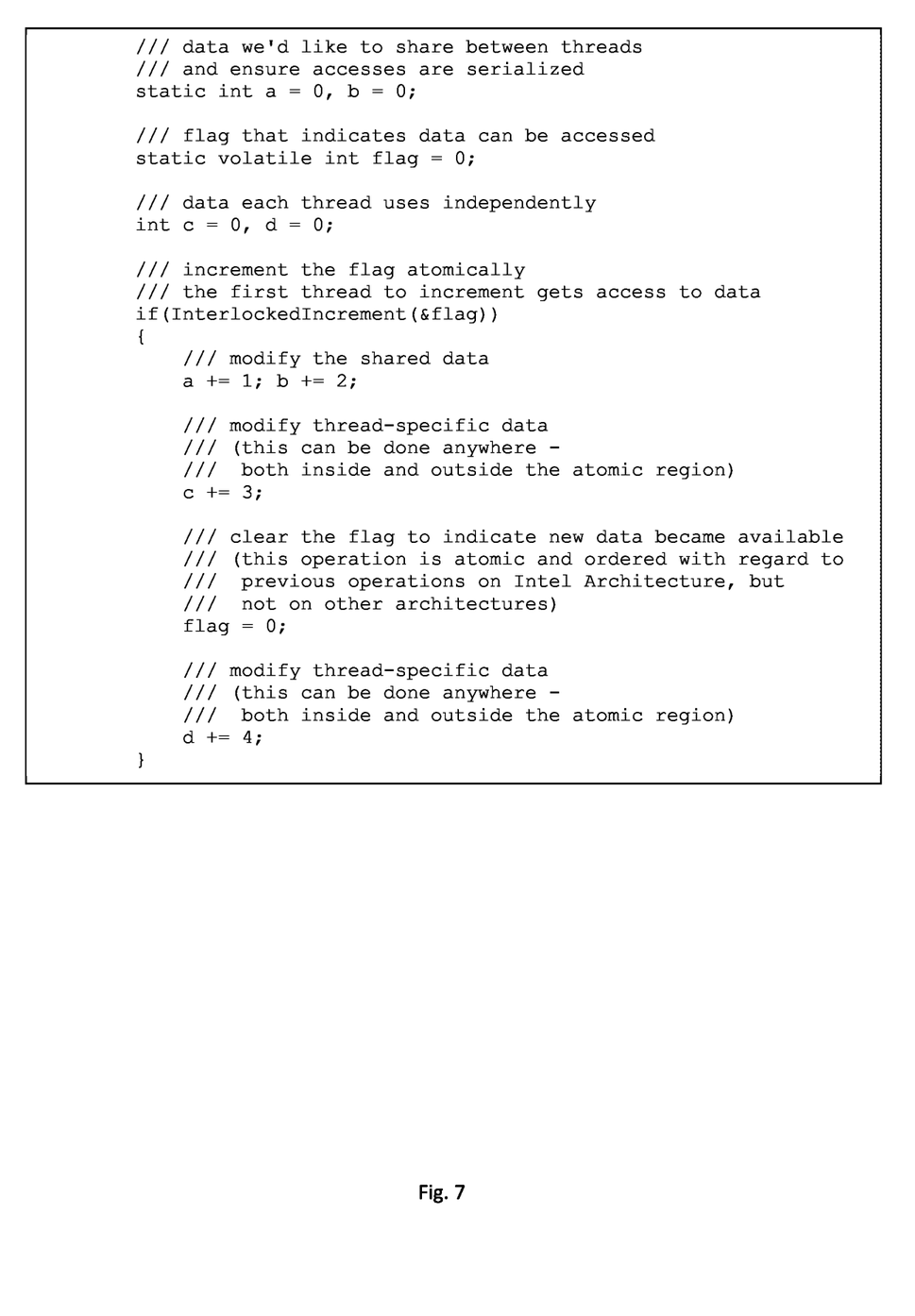
FIG. 7 shows a code snippet of a high-level code with an atomic flag.

Examples may be used with any other language and/or memory model, e.g. the code snippet of FIG. 7 is in C99, without atomic operations built into the language; however, the proposed approach in examples also applies. In this example, variables 'a' and 'b' are concurrently accessed from multiple threads, but their values should be consistent and in-sync, that is why accesses to those variables are guarded with an atomically incremented and decremented 'flag' variable.

Figure 8:
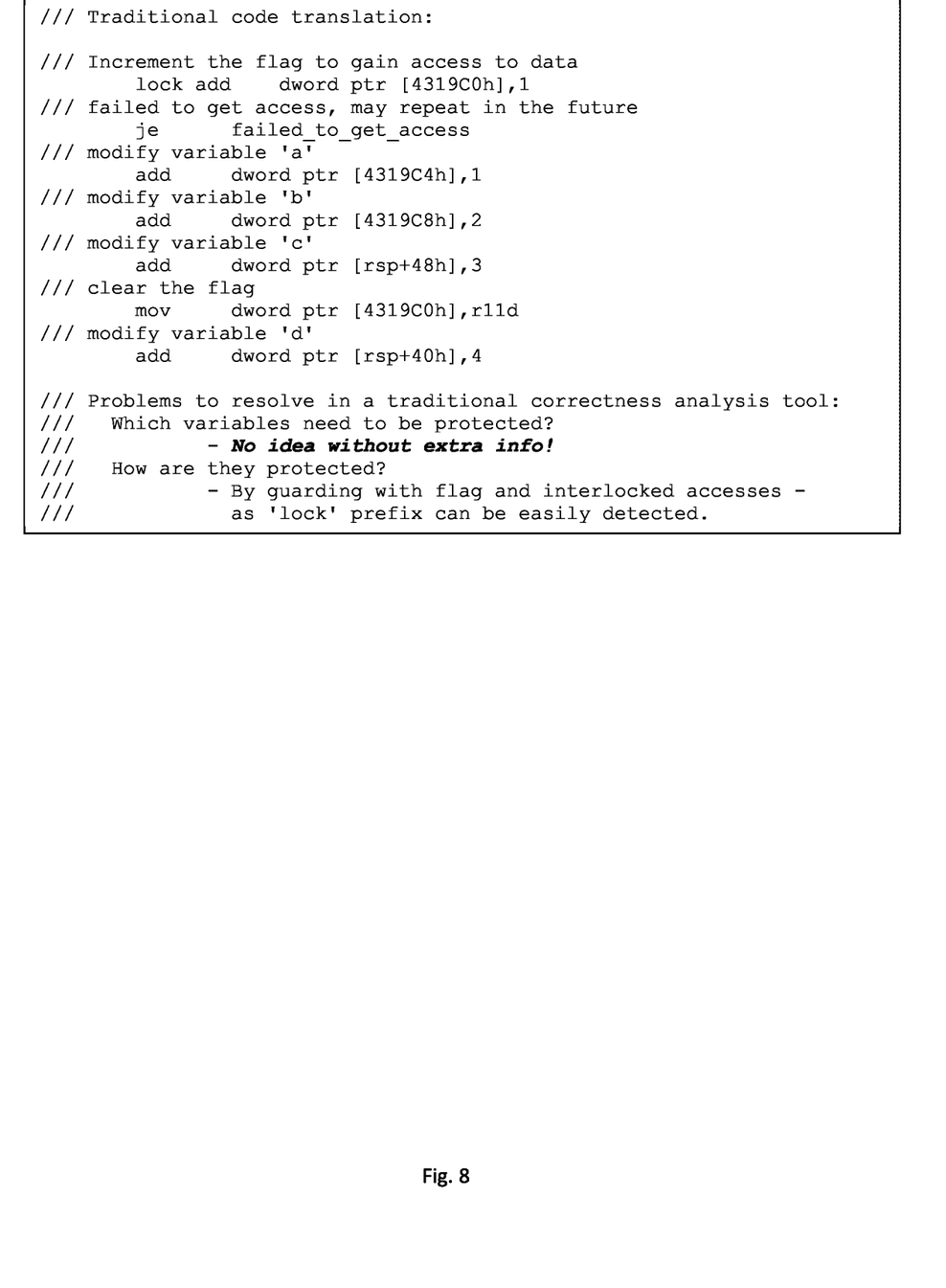
FIG. 8 shows a traditional translation into assembly code of the code snippet of FIG. 7.
Figure 9:
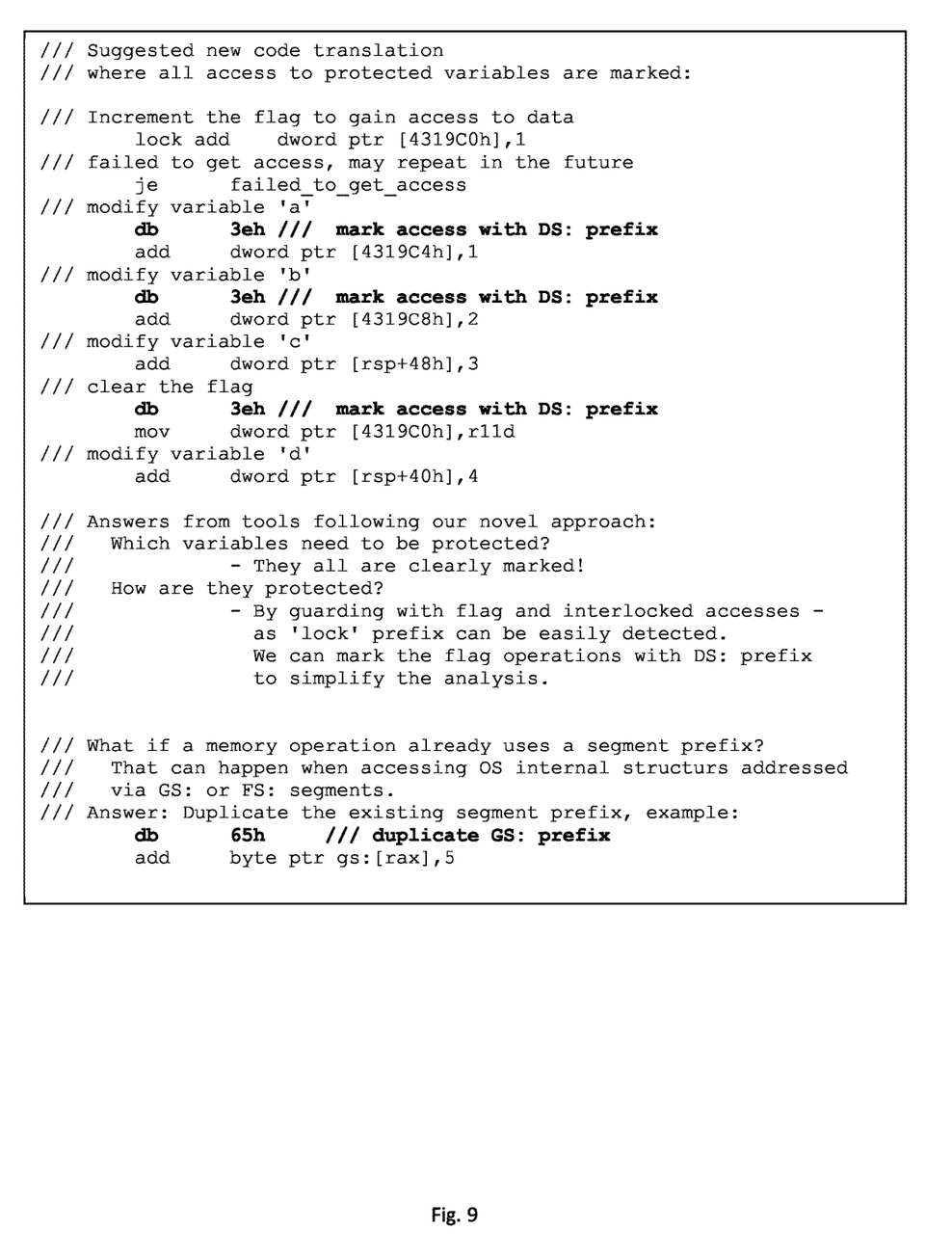
FIG. 9 shows a code snippet of assembly code with an atomic flag and indications for atomic operation in an example.

The difficulty for the parallel program correctness analysis tools arises from the fact that there is no information of what exactly the intentions of the programmer were, which variables are guarded, which memory ordering is implied, and which other memory operations get interspersed with the guarded operations by either a programmer or a compiler (e.g., access to variable 'c' and 'd'). FIG. 7 shows a code snippet of a high-level code with an atomic flag and its translation into assembly code is shown in FIG. 8. FIG. 9 shows a code snippet of assembly code with an atomic flag and indications for atomic operation in an example. From the translation a binary analysis tool can only detect a locked (atomic) operation on address [4319C0h], which corresponds to the 'flag' variable, but it may deduce no information as to which other memory operations have to be serialized, how they should be ordered with respect to accessing the 'flag' variable, and whether it is okay to access same memory locations from other threads. On the other hand, the example translation clearly indicates which operations are to be performed atomically as indicated in FIG. 9.

Figure 10:
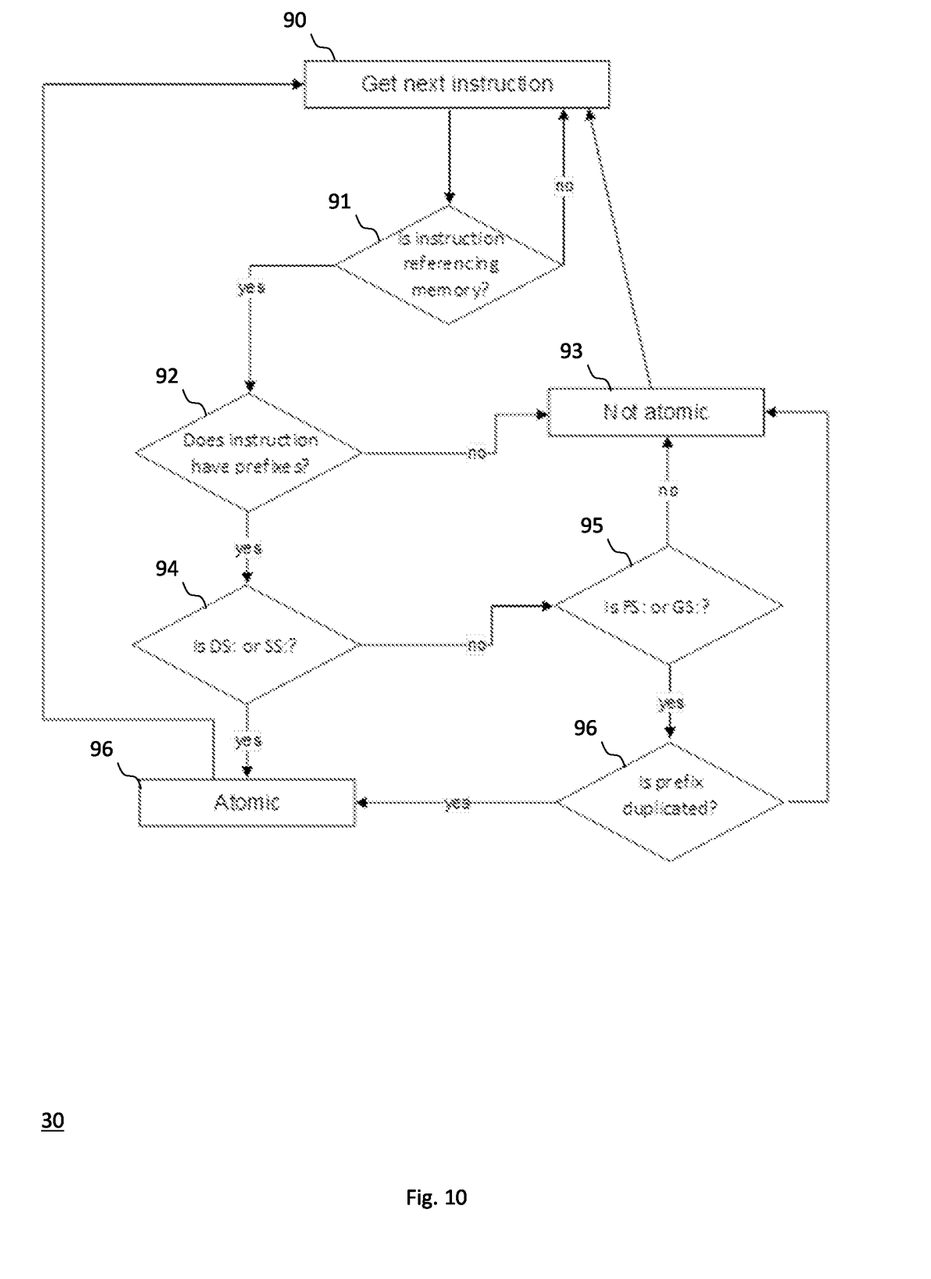
FIG. 10 shows a flow diagram of an example.

FIG. 10 shows a flow diagram of an example method. In box 90 a next instruction is loaded for analysis. In 91 it is checked whether the instruction references any memory and if not, it is returned to 90. In case the instruction references memory, in 92 it is determined whether the instruction has any prefixes. If not, then the instruction is considered non-atomic in 93. If the instruction does have a prefix, box 94 checks whether the prefix is DS: or SS:. In case the check of 94 is positive the instruction/access is considered atomic in 96. If the check of 94 is negative, the method checks in 95 whether the prefix is FS: or GS. If not the instruction/access is considered non-atomic in 93. In case the check 95 is positive it is further checked in 96 whether the prefix is duplicated. In case it is, the instruction/access is considered atomic in 96.

By following the proposed example algorithm as shown in FIG. 10, an analysis tool can detect whether a particular memory operation was supposed to be an atomic operation and/or had stricter memory ordering requirements presumed by a programmer.

Note that different examples may implement different code prefix patterns to mark the memory instructions. For example, one may choose to always double the prefixes (as x86 architecture allows that) to simplify the analysis and exclude false positives when analyzing legacy 16- and 32-bit software. Additionally or alternatively, other instruction sequences can be used to mark memory operations, if the use of prefixes is not desired or prefix encodings are not available, which is true for non-Intel architectures. For such architectures example may use an empty operation (or a sequence of operations), like NOP (no operation) immediately before or after (or surrounding) the marked memory operation. That way, examples may incorporate meta data into a binary without negative effects on program execution.

No matter how exactly examples may mark the atomic load/store operation (whether as x86 instruction prefixes or a sequence of NOPs), example may now build a self-sufficient tool to detect data races. The adverse effect of the proposed solution on code performance is negligible, as the number of atomic operations to be marked is significantly smaller than the number of ordinary memory operations, so the code size will not be an issue. The dynamic performance impact is negligible, as well, because the extra prefixes do not translate to micro-operations and thus are not executed.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some examples, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

An example (e.g., example 1) relates to an apparatus 10 comprising at least one interface 12 configured to read one or more high-level code instructions; and at least one processor 14 configured to read the one or more high-level code instructions using the interface determine atomic operations in the high-level code instructions, translate the one or more high-level code instructions into assembly code instructions, wherein atomic operations are indicated in the assembly code instructions based on the atomic operations in the high-level code instruction.

Another example (e.g., example 2) relates to the apparatus 10 as previously described, wherein the at least one processor 14 is configured to indicate the atomic operations in the assembly code instructions using meta information.

Another example (e.g., example 3) relates to the apparatus 10 as previously described, wherein the meta information is ineffective on a result of an execution of the assembly code instructions.

Another example (e.g., example 4) relates to the apparatus 10 as previously described, wherein the at least one processor 14 is configured to indicate the atomic operations in the assembly code instructions using information that is ignored by a processor architecture, the assembly code instructions are translated for.

Another example (e.g., example 5) relates to the apparatus 10 as previously described, wherein the processor architecture is a x86 architecture.

Another example (e.g., example 6) relates to the apparatus 10 as previously described, wherein the at least one processor 14 is configured to indicate the atomic operations in the assembly code instructions using instruction prefixes that do not affect a result of an instruction execution.

Another example (e.g., example 7) relates to the apparatus 10 as previously described, wherein the at least one processor 14 is configured to indicate the atomic operations in the assembly code instructions using distinguishable code patterns to mark atomic memory operations.

Another example (e.g., example 8) relates to the apparatus 10 as previously described, wherein the at least one processor 14 is configured to indicate the atomic operations in the assembly code instructions using excessive segment prefixes.

Another example (e.g., example 9) relates to the apparatus 10 as previously described, wherein the at least one processor 14 is configured to indicate the atomic operations in the assembly code instructions using a one-byte prefix before an atomic instruction in the assembly code instructions.

Another example (e.g., example 10) relates to the apparatus 10 as previously described, wherein the at least one processor 14 is configured to indicate the atomic operations in the assembly code instructions using a duplicated segment prefix that atomic operations use or imply.

Another example (e.g., example 11) relates to the apparatus 10 as previously described, wherein the at least one interface 12 is configured to output assembly code instructions, and wherein the at least one processor 14 is configured to output the assembly code instructions with the indicated atomic instructions using the at least one interface 12.

Another example (e.g., example 12) relates to an apparatus 20 comprising at least one interface 22 configured to read one or more assembly code instructions; and at least one processor 24 configured to determine indications for atomic operations in the one or more assembly code instructions, detect atomic operations based on the one or more assembly code instructions and the indications for the atomic operations in the assembly code instructions.

Another example (e.g., example 13) relates to the apparatus 20 as previously described, wherein the at least one processor 24 is configured to detect data races based on the atomic operations.

Another example (e.g., example 14) relates to the apparatus 20 as previously described, wherein the at least one processor 24 is configured to use the detected atomic operations for memory analysis.

Another example (e.g., example 15) relates to the apparatus 20 as previously described, wherein the at least one processor 24 is configured to determine the indications for the atomic operations in the one or more assembly code instructions using meta information.

Another example (e.g., example 16) relates to the apparatus 20 as previously described, wherein the meta information is ineffective on a result of an execution of the assembly code instructions.

Another example (e.g., example 17) relates to the apparatus 20 as previously described, wherein the at least one processor 24 is configured to determine the indications for the atomic operations in the assembly code instructions using information that is ignored by a processor architecture, the assembly code instructions are translated for.

Another example (e.g., example 18) relates to the apparatus 20 as previously described, wherein the processor architecture is a x86 architecture.

Another example (e.g., example 19) relates to the apparatus 20 as previously described, wherein the at least one processor 24 is configured to deter-mine the indications for the atomic operations in the assembly code instructions using instruction prefixes that do not affect a result of an instruction execution.

Another example (e.g., example 20) relates to the apparatus 20 as previously described, wherein the at least one processor 24 is configured to determine the indication for the atomic operations in the assembly code instructions using distinguishable code patterns used to mark atomic memory operations.

Another example (e.g., example 21) relates to the apparatus 20 as previously described, wherein the at least one processor 24 is configured to deter-mine the indications for the atomic operations in the assembly code instructions using excessive segment prefixes.

Another example (e.g., example 22) relates to the apparatus 20 as previously described, wherein the at least one processor 24 is configured to determine the indication for the atomic operations in the assembly code instructions using a one-byte prefix before an atomic instruction in the assembly code instructions.

Another example (e.g., example 23) relates to the apparatus 20 as previously described, wherein the at least one processor 24 is configured to determine the indication for the atomic operations in the assembly code instructions using a duplicated segment prefix that atomic operations use or imply.

Another example (e.g., example 24) relates to the apparatus 20 as previously described, wherein the at least one interface 22 is configured to output information on detected data races in the assembly code instructions, and wherein the at least one processor 24 is configured to output the information on the detected data races using the at least one interface.

Another example (e.g., example 25) relates to a method 30 for generating assembly code instructions, the method comprising reading 32 one or more high-level code instructions; determining 34 atomic operations in the high-level code instructions; and translating 36 the one or more high-level code instructions into assembly code instructions, wherein atomic operations are indicated in the assembly code instructions based on the atomic operations in the high-level code instruction.

Another example (e.g., example 26) relates to the method 30 as previously described, wherein the atomic operations in the assembly code instructions are indicated using meta information.

Another example (e.g., example 27) relates to a method 40 for detecting atomic operations, comprising reading 42 one or more assembly code instructions; determining 44 indications for atomic operations in the one or more assembly code instructions; detecting 46 atomic operations based on the one or more assembly code instructions and the indications for the atomic operations in the assembly code instructions.

Another example (e.g., example 28) relates to the method 40 as previously described, wherein the determining of the indications for the atomic operations in the one or more assembly code instructions uses meta information comprised in the assembly code instructions.

Another example (e.g., example 29) relates to a machine readable medium including code, when executed, to cause a machine to perform a method for generating assembly code instructions, the method comprising reading one or more high-level code instructions; determining atomic operations in the high-level code instructions; and translating the one or more high-level code instructions into assembly code instructions, wherein atomic operations are indicated in the assembly code instructions based on the atomic operations in the high-level code instruction.

Another example (e.g., example 30) relates to a machine-readable medium including code, when executed, to cause a machine to perform a method for detecting atomic operations, comprising reading one or more assembly code instructions; determining indications for atomic operations in the one or more assembly code instructions, detecting atomic operations based on the one or more assembly code instructions and the indications for the atomic operations in the assembly code instructions.

Another example (e.g., example 31) relates to an apparatus 10 comprising means for reading one or more high-level code instructions; and means for determining atomic operations in the high-level code instructions, means for translating the one or more high-level code instructions into assembly code instructions, wherein atomic operations are indicated in the assembly code instructions based on the atomic operations in the high-level code instruction.

Another example (e.g., example 32) relates to the apparatus 10 as previously described, further comprising means for indicating the atomic operations in the assembly code instructions using meta information.

Another example (e.g., example 33) relates to an apparatus 20 comprising means for reading one or more assembly code instructions; means for determining indications for atomic operations in the one or more assembly code instructions; and means for detecting atomic operations based on the one or more assembly code instructions and the indications for the atomic operations in the assembly code instructions.

Another example (e.g., example 34) relates to the apparatus 20 as previously described comprising means for detecting data races based on the atomic operations.

Another example (e.g., example 35) relates to a (computer) program including a program code to execute one or more of the methods described herein, when the program is executed on a computer, processor or other programmable hardware component.

Another example (e.g., example 36) relates to a compiler comprising the apparatus 10 or components to perform the method 30.

Another example (e.g., example 37) relates to an instrumentation or inspector tool comprising the apparatus 20 or components to perform the method 40.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus comprising:
    at least one interface configured to read one or more high-level code instructions; and
    at least one processor configured to
        read the one or more high-level code instructions using the interface,
        determine atomic operations in the high-level code instructions, and
        translate the one or more high-level code instructions into assembly code instructions, wherein atomic operations are indicated in the assembly code instructions based on the atomic operations in the high-level code instruction,
    wherein the at least one processor is configured to indicate the atomic operations in the assembly code instructions using information that is ignored by a processor architecture for which the assembly code instructions are translated,
        wherein the at least one processor is configured to indicate the atomic operations in the assembly code instructions by:
        i) using meta information, wherein the meta information is ineffective on a result of an execution of the assembly code instructions;
        ii) using instruction prefixes that do not affect a result of an instruction execution;
        iii) using distinguishable code patterns to mark atomic memory operations;
        iv) using excessive segment prefixes;
        v) using a one-byte prefix before an atomic instruction in the assembly code instructions; or
        vi) using a duplicated segment prefix that atomic operations use or imply.

2. The apparatus of claim 1, wherein the processor architecture is a x86 architecture.

3. The apparatus of claim 1, wherein the at least one interface is configured to output assembly code instructions, and wherein the at least one processor is configured to output the assembly code instructions with the indicated atomic instructions using the at least one interface.

4. An apparatus comprising:
   at least one interface configured to read one or more assembly code instructions; and
   at least one processor configured to
      determine indications for atomic operations in the one or more assembly code instructions, and
      detect atomic operations based on the one or more assembly code instructions and the indications for the atomic operations in the assembly code instructions,
   wherein the one or more assembly code instructions are translated from one or more high-level code instructions, and the atomic operations are indicated in the one or more assembly code instructions based on atomic operations in the one or more high-level code instructions,
   wherein the indications for atomic operations in the one or more assembly code instructions are provided using information that is ignored by a processor architecture for which the assembly code instructions are translated,
   wherein the indications for atomic operations in the one or more assembly code instructions are provided by:
   i) using meta information, wherein the meta information is ineffective on a result of an execution of the assembly code instructions;
   ii) using instruction prefixes that do not affect a result of an instruction execution;
   iii) using distinguishable code patterns to mark atomic memory operations;
   iv) using excessive segment prefixes;
   v) using a one-byte prefix before an atomic instruction in the assembly code instructions; or
   vi) using a duplicated segment prefix that atomic operations use or imply.

5. The apparatus of claim 4, wherein the at least one processor is configured to detect data races based on the atomic operations.

6. The apparatus of claim 4, wherein the at least one processor is configured to use the detected atomic operations for memory analysis.

7. The apparatus of claim 4, wherein the processor architecture is a x86 architecture.

8. The apparatus of claim 5, wherein the at least one interface is configured to output information on detected data races in the assembly code instructions, and wherein the at least one processor is configured to output the information on the detected data races using the at least one interface.

9. A method for generating assembly code instructions, the method comprising:
   reading one or more high-level code instructions;
   determining atomic operations in the high-level code instructions; and
   translating the one or more high-level code instructions into assembly code instructions, wherein atomic operations are indicated in the assembly code instructions based on the atomic operations in the high-level code instruction, wherein the atomic operations are indicated in the assembly code instructions using information that is ignored by a processor architecture for which the assembly code instructions are translated,
   wherein the atomic operations are indicated in the assembly code instructions by:
   i) using meta information, wherein the meta information is ineffective on a result of an execution of the assembly code instructions;
   ii) using instruction prefixes that do not affect a result of an instruction execution;
   iii) using distinguishable code patterns to mark atomic memory operations;
   iv) using excessive segment prefixes;
   v) using a one-byte prefix before an atomic instruction in the assembly code instructions; or
   vi) using a duplicated segment prefix that atomic operations use or imply.

* * * * *